Nov. 28, 1967    D. GREEN    3,354,685

HYDROSTATIC EXTRUSION APPARATUS

Filed July 15, 1965    2 Sheets-Sheet 2

United States Patent Office 3,354,685
Patented Nov. 28, 1967

3,354,685
HYDROSTATIC EXTRUSION APPARATUS
Derek Green, Lytham St. Annes, England, assignor to United Kingdom Atomic Energy Authority, London, England
Filed July 15, 1965, Ser. No. 472,160
Claims priority, application Great Britain, July 31, 1964, 30,278/64
1 Claim. (Cl. 72—253)

ABSTRACT OF THE DISCLOSURE

Extrusion apparatus comprising a main pressure cylinder, having a bore stepped in a major part and a minor part, a free piston assembly fitting in the major part of the bore of the main cylinder, the free piston assembly having a subsidiary extension projecting into and fitting the minor part of the bore of the main cylinder, a secondary cylinder connecting with a smaller diameter extrusion chamber in the free piston assembly, a die orifice leading out of the extrusion chamber to the minor part of the bore of the main cylinder through a passageway in the subsidiary extension of the free piston assembly, a plunger fitting in the bore of the extrusion chamber and having a head of larger diameter fitting in the secondary cylinder, the arrangement being such that the pressurisation of liquid to a low operating pressure in the major part of the bore of the main cylinder acting on the head of the plunger results in generation of a high pressure in liquid surrounding a billet in the bore of the extrusion chamber and also results in the generation of an intermediately high pressure in liquid in the minor part of the bore of the extrusion chamber into which the extruded product emerges.

---

This invention relates to extrusion processes and in particular to hydrostatic extrusion processes in which the direct application of hydraulic fluid under pressure to a workpiece causes the workpiece to be extruded through a die. For example known apparatus for carrying out such a hydrostatic extrusion process comprises a plunger and cylinder assembly for pressurising the hydraulic fluid and an extrusion die mounted in the end of the cylinder so that, with a workpiece or billet loaded in the cylinder adjacent the extrusion die, movement of the plunger in the cylinder to cause pressurisation of the hydraulic fluid surrounding the workpiece results in extrusion of the workpiece through the die.

Brittle materials are hard to form by extrusion processes because of the cracking which occurs in such materials when extruded through a die into ambient atmospheric pressure. It has previously been found possible to eliminate the occurrence of such cracking in the extrusion of brittle materials by subjecting the material, as it leaves the die, to a high ambient fluid back pressure for example 100 tons per square inch and above. It has been found that the ambient back pressure applied to the material as it leaves the die should be such as to exert a hydrostatic pressure on the material sufficient to neutralise the tensile stresses in the outer layers of the material as it leaves the die—or at least to reduce such tensile stresses to a value lower than the ultimate stress of the material. Fluid for exerting such a back pressure on the material as it leaves the die is generally pressurised by means independent of the means for generating pressure in the fluid applied to extrude the workpiece.

It is an object of the present invention to provide extrusion apparatus in which a primary low pressure fluid source is employed for the generation of high pressure in a hydraulic fluid applied to a workpiece to achieve hydrostatic extrusion of the workpiece through a die and for the simultaneous generation of an intermediately high pressure in a hydraulic fluid applied to exert a fluid back pressure on the material of the workpiece as it is extruded through the die.

It is also a feature of the invention that such apparatus can be employed for conventional extrusion of a workpiece into hydraulic liquid applied to exert a back pressure on the extruded material as it emerges from the die.

According to the present invention extrusion apparatus comprises a main pressure cylinder having a bore stepped in a major part and a minor part of smaller diameter than the major part, means for pressurising hydraulic liquid in the major part of the bore of the main cylinder, a free piston assembly having a main section including a piston head fitting in the major part of the bore of the main cylinder, the free piston assembly having a subsidiary extension of smaller diameter than the piston head projecting into and fitting the minor part of the bore of the main cylinder, a secondary cylinder in the main section of the free piston assembly having its longitudinal axis in the direction of the longitudinal axis of the free piston assembly, said secondary cylinder having one end open to the major part of the bore of the main cylinder on the side of the free piston assembly remote from the minor part of the bore of the main cylinder and connecting at its other end with a co-extensive extrusion chamber also in the main section of the free piston assembly and of smaller diameter than the diameter of the secondary cylinder, the extrusion chamber being fitted with a plunger, said plunger having a head fitting in the secondary cylinder outside the extrusion chamber, an extrusion die being fitted in the end of the extrusion chamber remote from the secondary cylinder said extrusion die having connection with the minor part of the bore of the main cylinder through a passageway leading from the outlet of the die through the subsidiary extension of the free piston assembly.

Embodiments of the invention will now be described by way of example with reference to the accompanying drawings in which.

Figure 1:
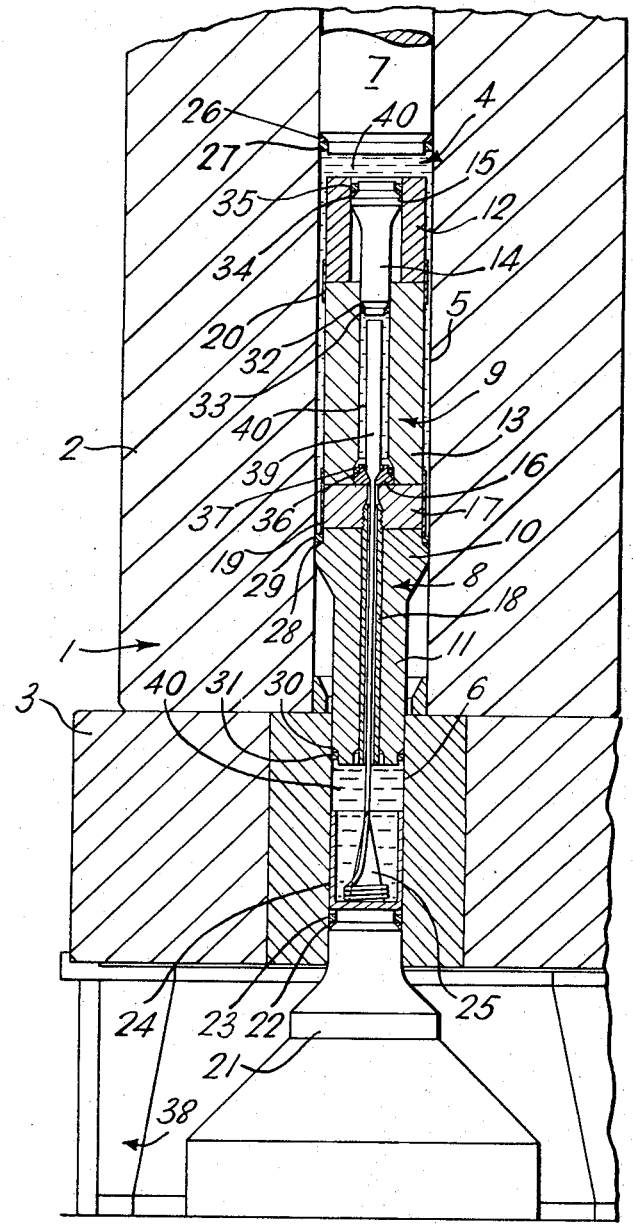
FIGURE 1 is a longitudinal sectional elevation of one form of hydrostatic extrusion apparatus in accordance with the invention.

The apparatus shown in FIGURE 1 of the drawings comprises a main cylinder assembly 1 constituted by an upper cylinder 2 of unitary form and a lower cylinder 3 of composite double ring construction.

The main cylinder assembly 1 has a compound bore 4 of stepped form comprising an upper major part 5 within the upper cylinder 2 and a lower minor part 6 of smaller diameter than the major part 5 within the lower cylinder 3.

A ram is fitted in the upper part 5 of the main cylinder bore 4.

A free piston assembly 8 operating in the main cylinder bore 4 has a main part 9 including a piston head 10 fitting in the upper part 5 of the main cylinder bore 4. The free piston assembly 8 has a smaller diameter subsidiary extension 11 which projects downwards from the piston head 10 to fit inside the lower part 6 of the main cylinder bore 4. The main part 9 of the free piston assembly 8 includes a secondary cylinder 12 mounted above an extrusion chamber 13. The secondary cylinder 12 has its upper end open to the upper part 5 of the main cylinder bore 4 and connects at its lower end with the extrusion chamber 13 which is of smaller bore diameter than the bore diameter of the secondary cylinder 13.

A plunger 14 extends from the secondary cylinder 12 into the extrusion chamber 13. The plunger 14 has a head 15 fitting in the secondary cylinder 12.

An extrusion die 16 is fitted at the lower end of the extrusion chamber 13. The die 16 is mounted in a die base 17 fitted to the piston head 10 of the free piston assembly 8.

A guide tube 18 screwed into the die base 17 forms a passageway leading from the extrusion die 16 through the subsidiary extension 11 of the free piston assembly 8 to the lower part 6 of the main cylinder bore 4.

The die base 17 is mounted on the piston head 10 of the free piston assembly 8 and is conjoined with the extrusion chamber 13 by a copper sleeve 19. The extrusion chamber 13 and the secondary cylinder 12 forming part of the free piston assembly 8 are cojoined by a copper sleeve 20.

The lower end of the main cylinder bore 4 is closed by a plug 21 sealed in the main cylinder bore 4 by a copper ring 22 and rubber O ring seal 23. A container 24 for receiving extruded material is mounted above the plug 21 in the lower part 6 of the main cylinder bore 4. The container 24 is of cylindrical form and is fitted internally with a conical guide member 25.

The ram 7 is slidably sealed in the upper part 5 of the main cylinder bore 4 by a copper ring 26 and a rubber O ring seal 27. The free piston assembly 8 is slidably sealed in the upper part 5 of the main cylinder bore 4 at the piston head 10 by a copper ring 28 and a rubber O ring seal 29. The subsidiary extension 11 of the free piston assembly 8 is sealed in the lower part 6 of the main cylinder bore 4 by a copper ring 30 and a rubber O ring seal 31. The plunger 14 is slidably sealed in the bore of the extrusion chamber 13 by a copper ring 32 and a rubber O ring seal 33. The head 15 of the plunger 14 is slidably sealed in the bore of the secondary cylinder 12 by a copper ring 34 and a rubber O ring seal 35. The extrusion die 16 is sealed in the lower end of the bore of the extrusion chamber 13 by a copper ring 36 and a rubber O ring seal 37. The whole assembly is mounted on a robust girder structure 38.

In use of the apparatus shown in FIGURE 1 a billet 39 to be extruded is loaded into the extrusion container 13 the end of the billet 39 being tapered for entry into the extrusion die 16. The space in the upper part 5 of the main cylinder bore 4 above the free piston assembly 8, the space in the extrusion chamber 13 surrounding the billet 39 and the space in the lower part 6 of the main cylinder bore 4 below the subsidiary extension 11 of the free piston assembly 8 are all filled with hydraulic liquid 40. The ram 7 is forced downwards by a suitable press so as to pressurise the hydraulic liquid 40 in the main cylinder bore 4 above the free piston assembly 8. The hydraulic liquid 40 above the free piston assembly 8 is, for example, pressurised to 50 tons per square inch, which pressure acts on the head 15 of the plunger 14 in the secondary cylinder 12 of the free piston assembly 8 and on the free piston assembly 8 as a whole. If, for example, the cross sectional area of the head 15 of the plunger 14 is made three times the cross sectional area of the plunger 14 itself the hydraulic liquid 40 surrounds the billet 39 in the extrusion chamber 13 will be pressurised to 150 tons per square inch. The pressure of the hydraulic liquid 40 in the extrusion chamber 13 on the billet 39 causes the billet 39 to be hydrostatically extruded through the extrusion die 16. The extruded material emerging from the extrusion die 16 as wire passes through the guide tube 18 into the lower part 6 of the main cylinder bore 4. The conical guide member 25 in the container 24 forms the extruded wire into a coil in the container 24.

Pressurisation of the hydraulic liquid 40 in the space above the free piston assembly 8 also applies a downward loading on the free piston assembly 8 as a whole so that the hydraulic liquid 40 in the lower part 6 of the main cylinder bore 4 below the subsidiary extension 11 of the free piston assembly 8 is pressurised to apply a back pressure on extruded material emerging from the extrusion die 16. If, for example, the cross sectional area of the piston head 10 of the free piston assembly 8 is made twice the cross sectional area of the subsidiary extension 11 of the free piston assembly 8, pressurisation of the hydraulic liquid 40 above the free piston assembly 8 to 50 tons per square inch will result in the hydraulic liquid 40 in the lower part 6 of the main cylinder bore 4 below the subsidiary extension 11 of the free piston assembly 8 being pressurised to 100 tons per square inch.

Apparatus in accordance with the invention can also be used for conventional extrusion of a billet into a back pressure provided by pressurised hydraulic liquid.

Figure 2:
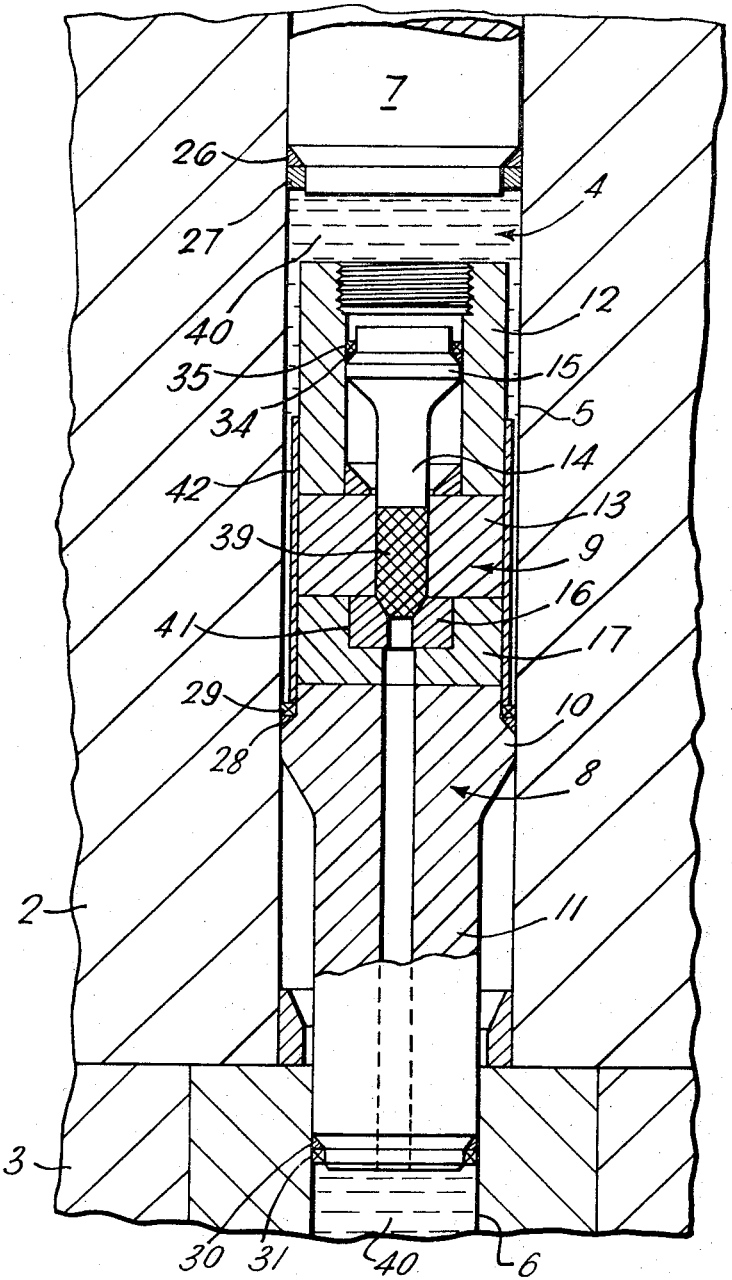
FIGURE 2 shows a modification of the apparatus shown in FIGURE 1.

FIGURE 2 shows extrusion apparatus similar to the apparatus shown in FIGURE 1 but having a free piston assembly 8 of modified form. In the free piston assembly 8 shown in FIGURE 2 the plunger 14 applies direct mechanical compression to the billet 38 in the extrusion chamber 13 as in a conventional extrusion process. The extrusion die 16 is fitted in a recess 41 in the die base 17 and the head 10 of the free piston assembly 8, the die base 17, the extrusion chamber 13 and the secondary cylinder 12 are all co-joined by a single copper sleeve 42.

As in the apparatus of FIGURE 1 the ram 7 is loaded to pressurise hydraulic liquid 40 in the main cylinder bore 4 above the free piston assembly 8, for example, to a pressure of 50 tons per square inch. The cross sectional area of the head 15 of the plunger 14 is made, for example, four times the cross sectional area of the plunger 14 itself so that the billet 39 is subjected to a compressive extrusion pressure of 200 tons per square inch. As in the apparatus of FIGURE 1 pressurisation of the hydraulic liquid 40 in the main cylinder bore 4 above the free piston assembly 8 also applies a downward loading on the free piston assembly 8 as a whole so that the hydraulic liquid 40 in the lower part 6 of the main cylinder bore 4 below the subsidiary extension 11 of the free piston assembly 8 is pressurised to apply a back pressure on extruded material emerging from the extrusion die 16.

I claim:

Extrusion apparatus comprising a main pressure cylinder having a bore stepped in a major part and a minor part of smaller diameter than the major part, means for pressurising hydraulic liquid in the major part of the bore of the main cylinder, a free piston assembly having a main section including a piston head fitting in the major part of the bore of the main cylinder, the free piston assembly having a subsidiary extension of smaller diameter than the piston head projecting into and fitting the minor part of the bore of the main cylinder, a secondary cylinder in the main section of the free piston assembly having its longitudinal axis in the direction of the longitudinal axis of the free piston assembly, said secondary cylinder having one end open to the major part of the bore of the main cylinder on the side of the free piston assembly remote from the minor part of the core of the main cylinder and connecting at its other end with a co-extensive extrusion chamber also in the main section of the free piston assembly and of smaller diameter than the diameter of the secondary cylinder, the extrusion chamber being fitted with a plunger said plunger having a head fitting in the secondary cylinder outside the extrusion chamber, an extrusion die being fitted in the end of the extrusion chamber remote from the secondary cylinder said extrusion die having connection with the minor part of the bore of the main cylinder through a passageway leading from the outlet of the die through the subsidiary extension of the free piston assembly.

References Cited

UNITED STATES PATENTS 2,558,035 6/1961 Bridgman _____ 72—60
3,126,096 3/1964 Gerard _____ 72—253

RICHARD J. HERBST, *Primary Examiner.*

K. C. DECKER, *Assistant Examiner.*